United States Patent [19]

Julian et al.

[11] Patent Number: 5,669,866
[45] Date of Patent: Sep. 23, 1997

[54] PUNCH PRESS WITH TOOL CHANGER

[75] Inventors: Alfred Joseph Julian, Roscoe; Kevin C. Nitz, Rockford, both of Ill.

[73] Assignee: W. A. Whitney Co., Rockford, Ill.

[21] Appl. No.: 662,460

[22] Filed: Jun. 10, 1996

[51] Int. Cl.$^6$ .......................... B23Q 3/156; B21D 37/14
[52] U.S. Cl. .................. 483/1; 83/552; 83/563; 483/29; 72/446
[58] Field of Search ............................ 483/1, 28, 29; 83/552, 563; 72/446, 442

[56] References Cited

U.S. PATENT DOCUMENTS

| | | | |
|---|---|---|---|
| 3,709,623 | 1/1973 | Stephan et al. | 408/22 |
| 3,973,863 | 8/1976 | Smith | 408/241 T |
| 4,000,954 | 1/1977 | Patel | 408/3 |
| 4,359,815 | 11/1982 | Toyoda | 29/568 |
| 4,423,546 | 1/1984 | Scott et al. | 483/29 |
| 4,587,716 | 5/1986 | Byton | 483/29 |
| 4,649,622 | 3/1987 | Scott et al. | 483/29 |
| 4,951,375 | 8/1990 | Erlenmaier | 483/29 X |
| 5,224,915 | 7/1993 | Kilian | 483/29 X |
| 5,342,276 | 8/1994 | Fujiwara et al. | 483/29 |

FOREIGN PATENT DOCUMENTS

| | | |
|---|---|---|
| 0 028 735 | 5/1981 | European Pat. Off. |
| 0 100 282 B1 | 2/1984 | European Pat. Off. |
| 0343552 A2 | 11/1989 | European Pat. Off. |
| 1 37 901 | 10/1979 | Germany . |
| 1477 578C3 | 3/1984 | Germany . |
| 3301036A1 | 3/1984 | Germany . |
| 3301036C2 | 3/1984 | Germany . |
| 3339340A1 | 5/1984 | Germany . |
| 3818001A1 | 11/1989 | Germany . |
| 1 417 620 | 12/1975 | United Kingdom . |
| 2 161 733 | 1/1986 | United Kingdom . |

*Primary Examiner*—William R. Briggs
*Attorney, Agent, or Firm*—Leydig, Voit & Mayer, Ltd.

[57] ABSTRACT

Method and Apparatus for economically providing an automatic tool changing capability to a numerically controlled punch press, without the addition of servo drives dedicated to the tool changer. The punch press has a back rail carrying work clamps and positionable along an X axis for positioning the workpiece along that axis. The punch and die assembly is carried in a work head which is servo driven along a Y axis, so that the pair of servos accomplish X, Y positioning with respect to the workpiece. A plurality of tool cartridges are carried on the back rail. To accomplish a tool change operation, the X axis servo is indexed to bring a selected tool holder to a tool change position, and the remaining positioning for making the tool exchange (either into an empty cartridge or from a full cartridge) is accomplished by Y positioning of the tool head, without the need to alter the workpiece Y position or index an auxiliary mechanism for a tool change operation.

6 Claims, 4 Drawing Sheets

5,669,866

PUNCH PRESS WITH TOOL CHANGER

FIELD OF THE INVENTION

Background Of The Invention

This invention relates to punch presses of the numerically controlled type, and more particularly to those which have tool change capability.

Punch presses of this type have a vertical punch which is reciprocated to coact with an underlying die to form a hole in an intervening workpiece horizontally disposed on a workbed. A stripper usually encircles the punch and holds the workpiece downwardly against the die when the punch is retracted in order to prevent the workpiece from being lifted upwardly by the punch.

The invention more particularly concerns the tool changing aspect of the punch press, in which the tool set, which includes the punch, the stripper (when used) and the die, is removed automatically from respective tool holders in the work head and replaced with another set of tools of a different size or shape.

Numerically controlled punch presses with tool changers are highly preferred because they are highly efficient and very accurate high-production machines. However, they can be expensive. For example, in the most versatile embodiment, the tool changer includes a multiple tier magazine associated with a tool changing robot arm. The tool changing equipment in such a machine, which include not only the tool changer, but also the associated servomechanisms and the portion of the numerical control devoted to tool changing, can add 25% to the cost of the basic N/C punch press. There have been approaches to providing less flexible, less complex, less expensive tool changers, and while they have reduced the element of cost, usually at the expense of flexibility, they have presented a different array of problems.

In the most versatile implementation, a tool changer for a punch press can be based on a tool turret or magazine which cooperates with a two-position robot arm. When a tool change is desired, the tool head of the punch press is brought to a tool change position, the robot arm, which had previously selected the next tool, approaches the work head, indexes an empty tool holder into position to remove the old set of tools, retracts, rotates, then indexes the tool holder with the new set of tools into place to transfer them to the work head, then retracts, whereupon the operation is complete. This is typically accomplished in 10 seconds or less. The tool head then goes on to the next sequence of the cycle using the new tool set, while the tool changer returns to the magazine to replace the removed tool in its location, and select the next tool in preparation for the next tool change cycle.

Machines of that type are highly flexible in that they can be configured to accommodate a large number of tools, and much of the tool change cycle is accomplished by the tool changing mechanism while the work head is actively carrying out production. The tool change is relatively straightforward in that the tool positioning arm has an empty carrier ready to receive the old set of tools and immediately has the new set of tools available to put into position. These mechanisms can be expensive, however, because they require multiple sets of servos for indexing the tool changer, indexing the magazine, and rotating the tool change arm.

An example of a turret based tool changer can be found in Scott U.S. Pat. No. 4,649,622.

Attempts have been made to reduce the cost of a numerically controlled tool changing punch press by associating the tool change mechanism with elements of the machine which are already servo driven, so as to eliminate the need for servos dedicated only to the tool change operation. As an example, Erienmaier U.S. Pat. No. 4,951,375 shows a plurality of tool holders mounted on the back rail of a typical punch press. The back rail can be indexed in two orthogonal directions, usually termed X and Y, for controlling the workpiece which is held to the back rail by two or more work clamps. When it is desired to perform a tool change operation, the back rail is indexed to bring the selected tool holder to the work head by indexing in the X and Y direction. It is as if an instruction is given to the numerical controller to punch a hole at the location of the selected tool holder.

The difficulty presented by this arrangement is that the workpiece must be indexed, often a significant distance, in order to perform a tool change operation. Not only must the workpiece be indexed in the X direction (so that the workpiece moves along the length of the bed), but it must also be indexed in the Y direction so the work is moved across the work head to bring the back rail to the work head. If a wide workpiece is being worked, it will extend well beyond the work head, requiring an extended bed in the y-axis in order to accommodate this motion.

While a tool changer punch press of this type can be quite cost effective, it still has disadvantages as a solution for machines designed to process large parts. In this construction the workpiece is carried on a worktable which moves in the Y axis direction. Generally the worktable is carried on a Y axis guidance system which also carries the X axis guidance system which in turn carries workclamps which grip the sheet along one edge parallel to the X axis. Rapid acceleration and deceleration rates are required to obtain production rates expected of these machines. These rapid acceleration and deceleration rates produce reaction forces which tend to bend the transverse X axis rail and Y axis guidance structure. These forces increase as the part length increases and result in heavy twisting forces on the X axis rail and Y axis guidance system. The X rail and Y guidance system must be strong and stiff in construction and as a result are heavy and expensive to manufacture.

A completely different type of tool changer punch press is described and claimed in Scott et al U.S. Pat. No. 4,423,546. In this apparatus, a tool change magazine or turret is provided at one end of a set of ways which controls movement of the work head, on the end of the machine opposite the back rail. The magazine requires its own servo drive and N/C positioner in order to bring an operative tool into a tool change position. When a tool change is desired, the work head is indexed away from the workpiece to bring it to the free end of the machine where the turret resides. The turret is permanently fixed in position at the end of the head mechanism, so that rotation of the turret brings a selected position within the magazine to the tool change position. The head indexes to the end of its travel, whereupon the punch holder and die holder are indexed into apertures in the turret. In a first half of the cycle, they deposit the currently carried set of tools into an empty carrier, then withdraw whereupon the turret indexes to a new position containing the selected set of tools, the head is again reversed to index it into the tool change position to pick up the new set of tools, following which the head is again reversed and brought back to the next punching position.

A tool changer punch press of this design has constructional advantages. Since the workpiece is stationary on the Y axis, the length of the press frame is approximately one half of that required when the workpiece is moved in the Y axis direction. The X axis back rail does not move in the Y axis. It can be rigidly bolted to the bed of the press frame and additionally supported by members bolted directly to the floor. Such construction produces a strong rigid machine well suited for handling long workpieces and heavy plates. However it still contains the expense of servo systems dedicated to the tool change function.

SUMMARY OF THE INVENTION

In view of the foregoing, it is a general aim of the present invention to provide a computer controlled punch press which maintains the basic structural advantages outlined but reduces construction costs by eliminating servo systems dedicated to the tool change function.

In that regard, it is an object of the present invention to associate a tool change mechanism with a numerically controlled punch press in such a way that no additional servomechanisms are required for indexing the tool changer, while at the same time minimizing the need to move the workpiece during the tool change operation.

Considering that the basic punch press is a rigid machine particularly configured for high accuracy operation, it is an object of the invention to provide a tool change capability for such a machine, without the need for adding servomechanisms, and without paying the penalty of loss of accuracy which would accompany unneeded repositioning of the workpiece.

More particularly, an object of the present invention is to accomplish an automatic tool change operation without the need for multiple direction indexing of the workpiece.

Thus, particularly in heavy duty machines which are adapted to punch plate metal of significant dimension, where the rail is quite long and the work clamps can be well separated, movement of the workpiece is restricted to movement along a single axis best supported by the back rail, and movements toward or away from the back rail are avoided. It is these movements, particularly when carrying large heavy plates, which can actually cause significant deflection or whipping of the back rail during rapid in and out movement. Avoiding the necessity for such movement not only reduces stress on the machine components, but also increases overall accuracy in that the tendency to displace the workpiece or otherwise misalign components when handling heavy plate is avoided.

It is a feature of the invention that a conventional unidirectional back rail system with workclamps is used to index the sheet along a single linear coordinate in the X direction, multiple tool cartridges with tool sets are mounted to the X axis table which also carries the workclamps, an indexable work head has a position control for movement along a Y axis, and those same X and Y axis controllers are used to index the back table to align a tool set with the indexable workhead, whereupon the work head is moved across the work to the back rail, in order to perform a tool change operation.

These and other objects, advantages and features of the invention will become more apparent from the following detailed description when taken in conjunction with the accompanying drawings.

Figure 1:
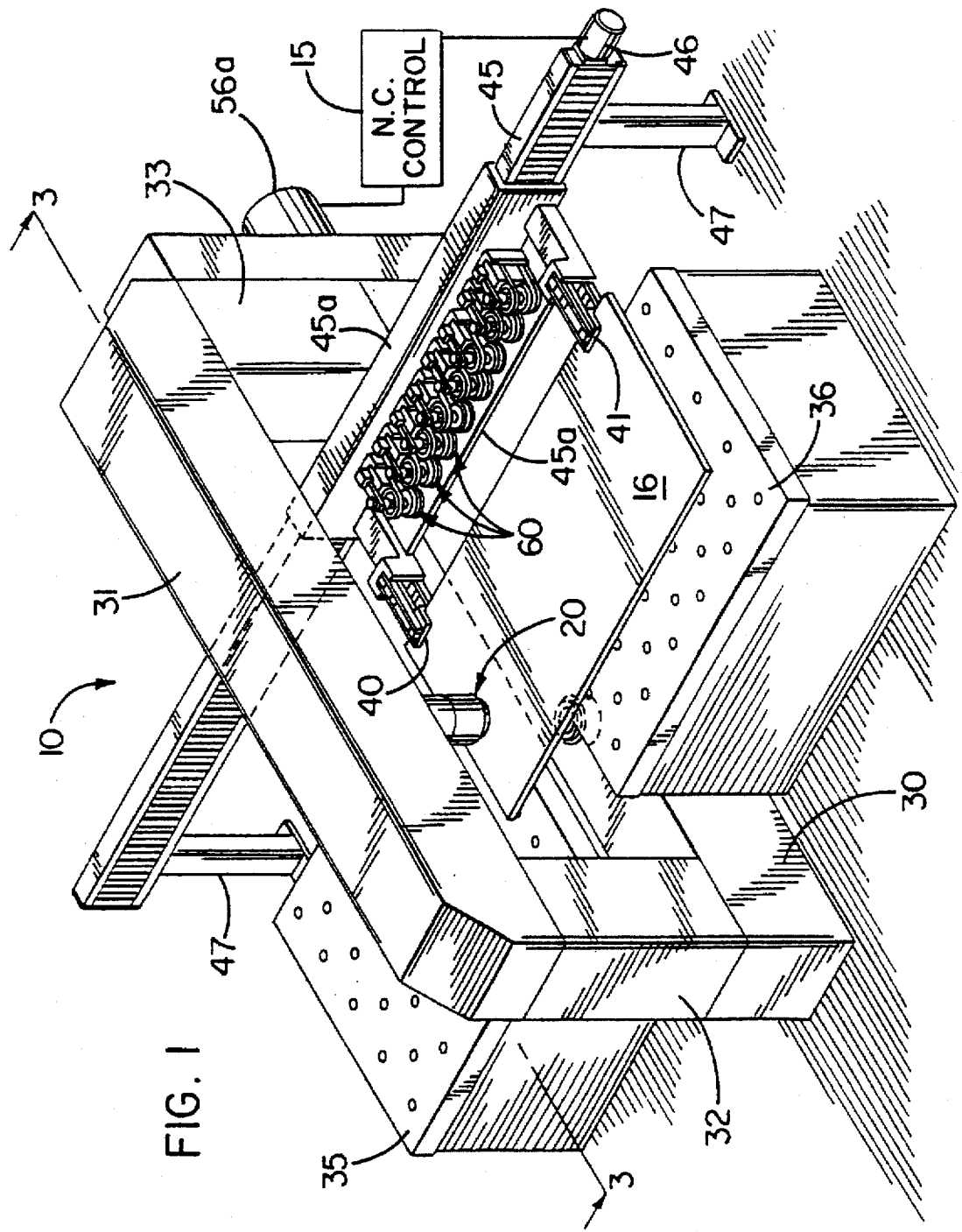
FIG. 1 is a perspective view showing the punch press with tool changer constructed in accordance with the present invention.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

For purposes of illustration, the invention is shown in FIG. 1 as embodied in a punch press 10 having a numerical controller 15 configured to operate a work head 20 to form a workpiece 16, such as by punching a pattern of holes in the workpiece under the control of the numerical controller 15. To that end, and as will be described in greater detail below, the numerical controller 15 is connected to particular servo drives on the punch press 10. In practicing the invention, the servo drives are those which are normally used to control X-Y indexing of the work head 20 and the workpiece 16, and are used in accordance with the invention for also performing a tool change operation.

Referring to the press 10 in greater detail, it will be seen that the machine includes a main support or base 30 which herein carries an overhead bridge 31 supported on columns 32, 33 extending between the base 30 and the bridge 31. The frame members define a large and generally rectangular opening or throat within which a portion of the workpiece 16 is located, and within which the punching operation takes place. Tables 35, 36 are disposed on opposite sides of the frame to support the workpiece, there being additional table structure (see FIG. 3) within the throat. The workpiece is adapted to be shifted laterally (i.e., perpendicularly to the bridge) on the tables along an X axis by clamps 40, 41 which grip the rear margin of the workpiece 16.

For purposes of rigidifying the machine, the back rail 45 is a structural steel member rigidly supported by a plurality of legs 47 (only two of which are shown), and securely bolted to the floor. A back rail table 45a is mounted for traverse along the back rail. FIG. 1 shows that arrangement only schematically, but it will be apparent to those skilled in the art that an appropriate way and bearing structure is utilized to allow a servo motor 46 driving a lead screw (not shown) to position the back rail table 45a in any desired position, with good accuracy, along the back rail as determined by the numerical control 15. The back rail table 45a is illustrated as a table with a supporting surface under the tool set, but it will be apparent that the supporting surface is not essential to the practice of the invention. The back rail table 45a is referred to as a table, primarily to distinguish it from the back rail 45 itself; occasionally herein the overall arrangement will be generally referred to by the back rail 45. In the short, the back rail assembly supports a linear array of elements (workclamps and tool holders) for translation by means such as servo motor under the control of the N/C program controller 15. When the clamps 40, 41 are engaged with the workpiece as shown at FIG. 1, the N/C control thus operates through the back rail arrangement described in order to accurately control the positioning of the workpiece along the X axis.

For controlling the Y coordinate of a punching operation, servo motors 55, 56 (see FIG. 3) drive a pair of lead screws 57, 58 which move the work head elements including the punch holder 52 and die holder 53 in tandem fore and aft along the Y axis. The servo motors 55, 56 are sometimes replaced by a single servo motor 55a (as generally illustrated in FIG. 1) which operates both lead screws 57, 58 by means of a precision belt drive.

Figure 3:
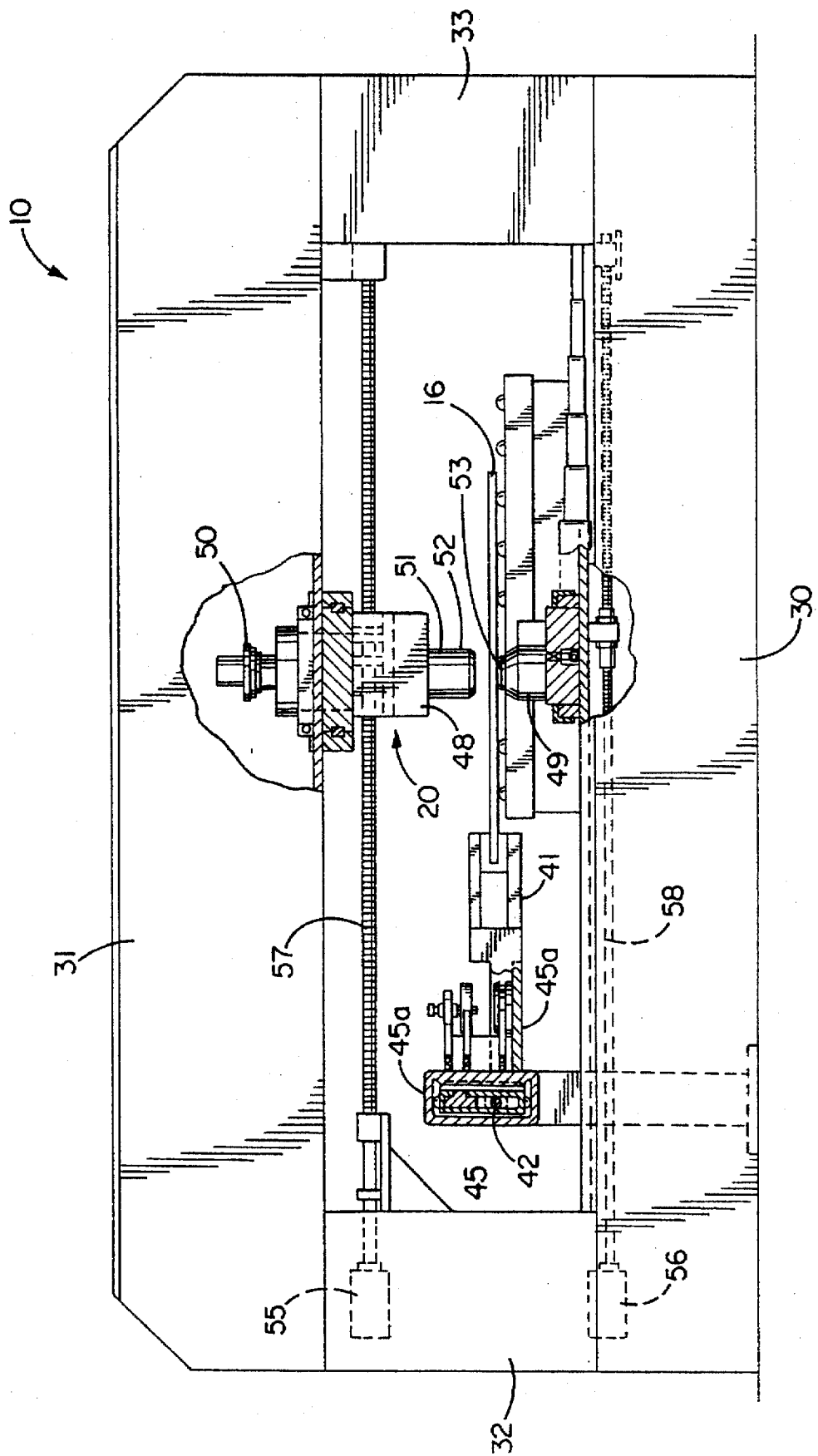
FIG. 3 is a side elevation, partly cut away, showing the relationship between the work head, the back rail and the tool holder of the punch press of FIG. 1.

As best shown in FIG. 3, the bridge 31 carries a hydraulic actuator 50 which drives a vertical reciprocatable ram 51 whose lower end carries a punch which cooperates with a die carried below the workpiece 16. The elements which thus carry and drive the punch are sometimes referred to herein as the work head and include a ram/punch carriage 48 and a die carriage 49 mounted for synchronized translation. Insofar as the tool changing operation is concerned, the punch carriage of the work head includes a gripping mechanism generally designated 52 which clamps the punch and which is attached to the ram 51, and a stripper holder also associated with the ram. A die holder 53 is carried on the die carriage 49.

In summary, in order to punch a hole in the workpiece 16 at a particular coordinate, the numerical control 15 outputs signals to the servo motors 46 for the X coordinate and 55, 56 for the Y coordinate. The servo motor 46 moves the back table 45a to establish the X coordinate, and the servo motors 55, 56 move the work head to set the Y coordinate. The ram 50 is then actuated to punch the workpiece, then withdraw the punch and raise the stripper in preparation for indexing to the next location.

For purposes of scale, it will be appreciated that a typical machine utilizes a ram which generates 40 tons of punching pressure, and a workpiece 16 can be on the order of 10 feet long (along the X axis), 4 feet or more wide (along the Y axis), and typically on the order of a ¼" in thickness (to a maximum of ¾"). It is not unusual for the workpiece to weigh 1,000 lbs. or more. Such a workpiece can be completely processed in a matter of one to two minutes by a punch press operating in automatic cycle mode.

The invention is based in part on the desire to avoid imposing undue stresses on the X transverse rail and Y guidance system. The drives 55, 56 typically have a substantially constant load, in that they are moving only the work head. The horizontal servo drive 46 has a load which depends on the weight of the workpiece which, as will be appreciated from FIG. 3, is supported on roller balls on the table. In spite of the roller ball support, the forces and moments imposed on the back rail by the workpiece can be significant. Those are minimized in accordance with the present invention by causing the back rail to move only in the horizontal direction along the X axis, and to accomplish tool changing by taking full advantage of the Y axis movement of the work head. It will also now be apparent to those skilled in this art, that the machine maintains its high precision capability, even when functioning on heavy or large workpieces. In other words, the fact that the workpiece is indexed in only one direction avoids the imposition of high torque loads on the back rail, and instead accomplishes Y positioning by moving the workhead while maintaining the workpiece in a constant Y position. The avoidance of torque loads on the positioning system, and restraining movement of the workpiece to only a single direction allows large or heavy workpieces to be handled without introducing errors in positioning which will invariably result from the reaction of the machine to heavy torque loads. Providing a tool changing mechanism which operates in accordance with the invention, does not comprise those structural features of the machine, in that tool changing is also accomplished without unnecessary movement of the workpiece, or any movement whatsoever of the workpiece in the Y direction.

In accordance with the present invention, the back rail 45, in spite of the fact that it allows translation in the X direction only, is configured as a tool holder for an automatic tool changer. In the illustrated embodiment, that is accomplished by providing a plurality of stations 60 along the back rail table 45a which serve to accommodate a plurality of tool cartridges, each cartridge holding a tool set. To accomplish a tool change, the X axis servo is driven to bring a selected tool cartridge to a tool change position, in alignment with the workhead, and the Y axis servo is activated to bring the tool head past the work to the rail for the purpose of changing tools. Normally a tool change operation will involve a two-step process in which an operating set of tools is first transferred to an empty cartridge, the work head withdrawn, the back rail is further indexed to bring a selected cartridge into position, then the work head is again advanced to the back rail to grasp and withdraw the newly selected tool set.

While a two-step operation of that type is less efficient than would be accomplished by a robot type tool changer as described in the aforementioned Scott et al patent, the ability to provide tool changing capability of any form without additional servos dedicated to the tool changer, represents a substantial manufacturing cost advantage in a machine of this type.

Figure 2:
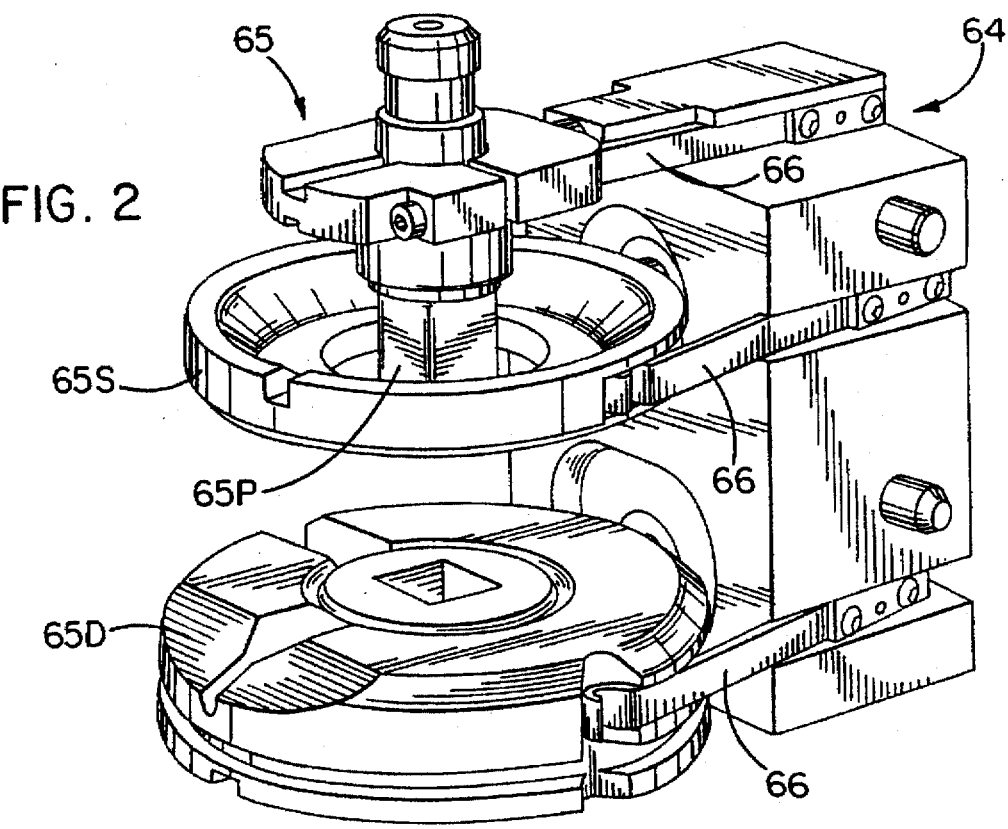
FIG. 2 is a perspective view showing the tool holder with a tool set for use in the punch press of FIG. 1.

Referring to FIG. 2, there is shown a tool cartridge 64 with a complete tool set 65 installed therein. As is well known, the tool set includes an upper punch 65P, and intermediate stripper 65S, and a lower die 65D. Those elements are held in stacked orientation in the cartridge 64 by means of spring fingers 66. It will also be appreciated by those skilled in the art, that some tool sets use no stripper, and simply consist of a punch 65P and a die 65D. When the term tool sets is used herein, it is intended to include both forms, either the three tool set or the two tool set.

A more complete description of a tool holder as used herein, can be found in the aforementioned Scott et al patent to which the reader is referred. Briefly, however, the cartridge comprises an upright, block-like body having three vertically spaced pairs of laterally spaced spring fingers 66 for releasably gripping and holding the tools 65 of the tool set. The head 20 is advanced to engage the tools 65 of a selected tool set, by moving the head 20 along a lateral path defined by the bridge 31. After the locking devices associated with the head 20 have been actuated to lock the tools in the head, the head is retracted from the back rail 45. As an incident thereto, the spring fingers automatically release the tools to leave the tools in the head 20, while permitting the head to retract, and the cartridge 64 to remain on the back rail. After the selected tool set has finished its work, the head 20 is again advanced toward the back rail 45 and engages the empty cartridge 64 to cause the spring fingers to automatically snap over and grip the tools. Once the locking devices of the head 20 have been released, the head is retracted and the tool set is pulled out of the head by the fingers 66. In this way, a tool set may be returned to it indexed location along the back rail 45.

Several cartridges 64 containing punches 65P, strippers 66S and dies 66D of different sizes and shapes are contained in the equivalent of a tool storage rack, which is disposed along the back rail 45. The punch 65P and stripper 66S of a tool set are carried in the punch carriage 48 of the head 20, while the die 22D is carried in the die carriage 49 of the head 20. The shape of the punch 65P and receiving hole of the die 65D define the shape and size of the cut-out provided by a given tool set 65. The cut-out made by the tool set 65 illustrated in FIG. 2 punches a square hole. In use, the die 65D will be brought into engagement with the bottom of the workpiece which is supported by the die on its underside. The punch is hydraulically driven downwardly, penetrating through the workpiece, and into the receiving bore of the die 65D. In this regard, it is appreciated that the orientation and alignment of the upper and lower head portions maintain a very strict tolerance so that the punch 65P precisely aligns with the receiving bore of the die 65D. Engaging the die 65D with the underside of the workpiece 16 minimizes the corruption (such as burring) of the edges in the cut-out formed by the punch 66P.

Once the punch 65P has been driven through the workpiece, the punch 65P is retracted. The stripper 65S facilitates this step by engaging the upper surface of the workpiece, so that the workpiece is not lifted off the table or deformed by withdrawal of the punch 65P. As illustrated in FIG. 2, the stripper 65S has a central aperture that loosely receives the punch 65P. Therefore, the punch 65P is moved vertically with respect to the stripper 66S, and the stripper 66S does not impede movement of the punch 65P.

It will be appreciated upon reference to FIG. 1 that the back rail table contains plurality of mounting positions. The end positions in the FIG. 1 illustration are occupied by workclamps 40, 41 and all of the intermediate position by tool holders 60. The back rail table is so configured, however, to use universal mounting, such that any position can mount either a workclamp or a tool holder.

In keeping with the invention, the tool changing apparatus is adapted to automatically align a selected cartridge 64 with the lateral path of the head 20, advance the head 20 into the cartridge 64 so that the tools 65 may be locked in the head 20, and then retract the head 20, leaving the empty cartridge 64 on the back rail 45, so that the tools can be used to punch the workpiece 16. After the punching operation has been completed, the apparatus realigns the empty cartridge 64 with the lateral path of the head 20 and advances the head to engage the empty cartridge. In a manner described above, this allows the head 20 to deliver the tools back to the cartridge, and readies the head to pick up another tool set. Thereafter, the apparatus may pick up another tool set from the storage rack 20 to perform further work on the workpiece. The movement of the workpiece needed to accomplish a tool change is limited to movement along a single axis, and the back and forth indexing associated with tool engagement and tool withdrawal does not require back and forth indexing of the entire workpiece.

Figure 4A:
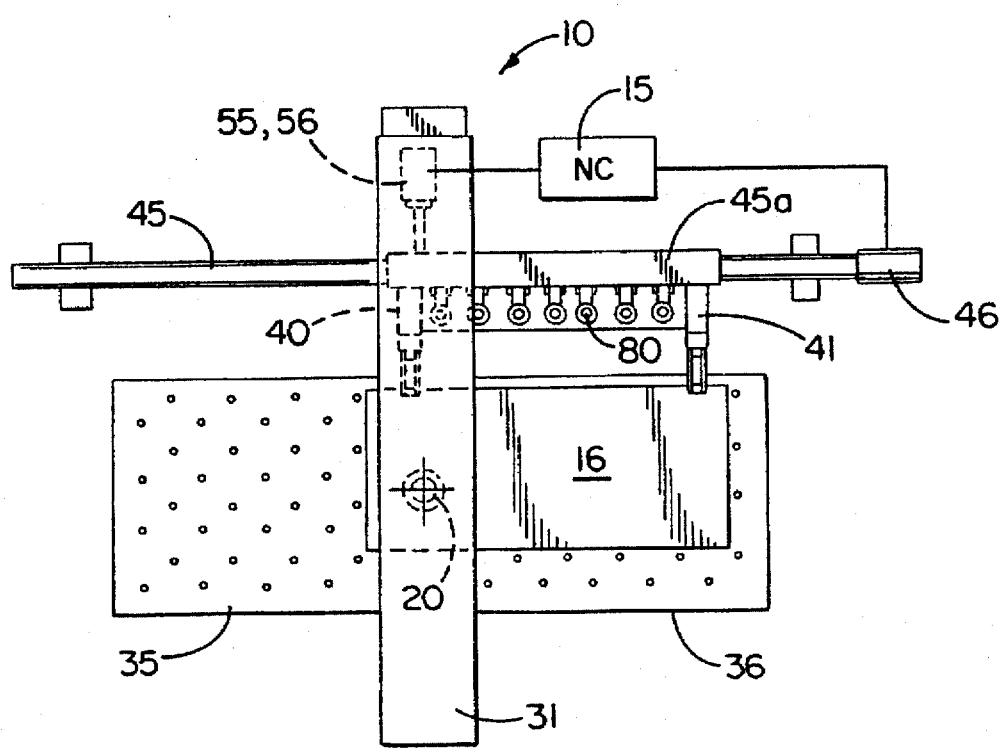
FIGS. 4A–4C are simplified plan views illustrating the indexing of the punch press of FIG. 1 for a tool change operation.
Figure 4B:
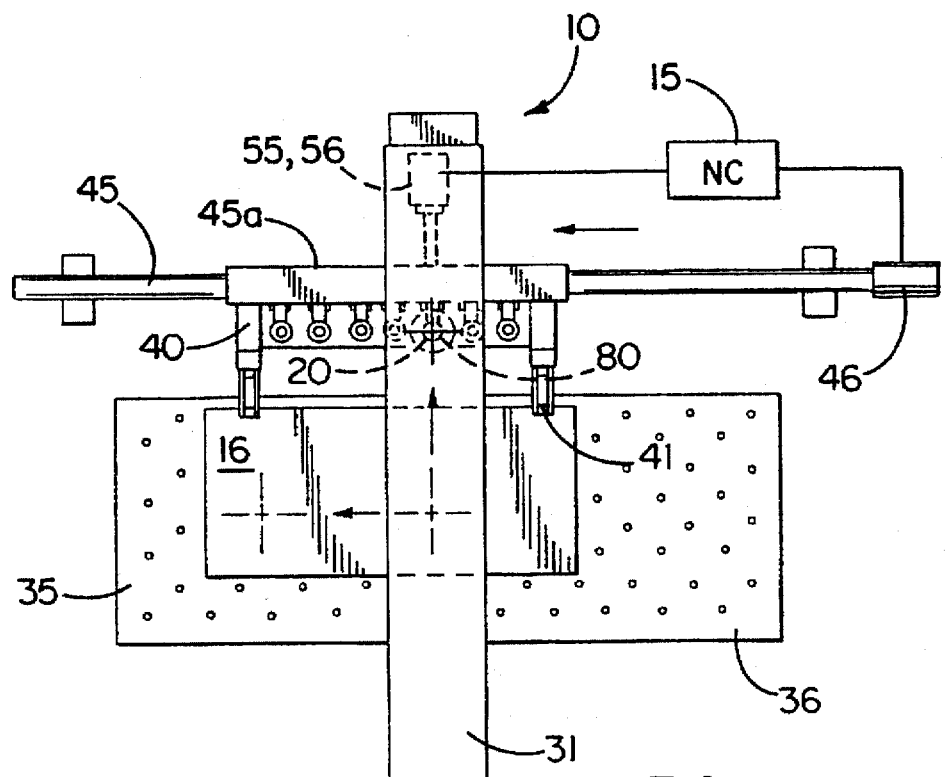
Figure 4C:
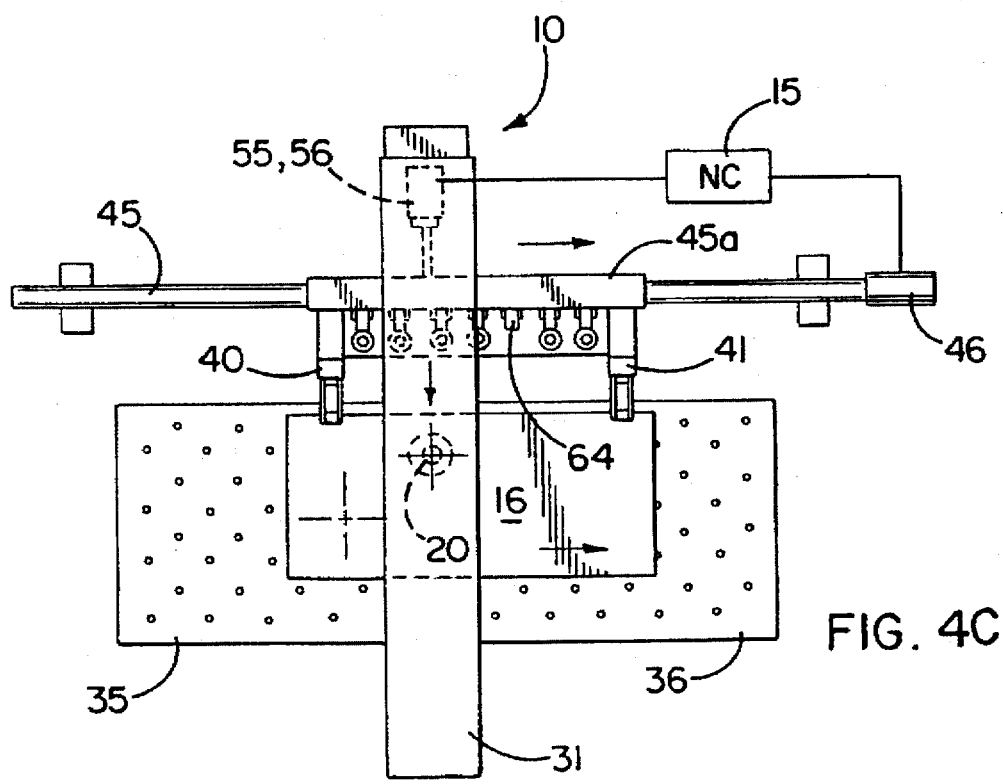

Reference is now made to FIGS. 4A through 4C, which present plan views to illustrate the tool changing operation of the present invention. In FIG. 4A, the press and workpiece are illustrated in a first position, whereby the workpiece 16 is disposed toward the righthand side of the work table. The punch is positioned to work along the left side of the workpiece at positions determined by the indexing of the X axis and Y axis servos. To illustrate a hypothetical tool change, suppose that tool 80, indexably located in the third illustrated position from the right, is selected for operation upon the workpiece 16. A typical tool change operation will consist of two substantially similar cycles, one for depositing the existing set of tools in an empty tool holder, and a second for withdrawing a new set of tools from an associated tool holder. The present example will describe only the second phase, realizing that the first phase is substantially the same. Thus, assuming that the workhead has already deposited the existing set of tools into an associated position in the rack, as illustrated in FIG. 4B, the back rail 45 in indexed linearly to align the newly selected tool 80 with the lateral path of the head 20. As previously described, the workpiece 16 is carried along with the tool storage rack by virtue of grippers 41. In the position shown in FIG. 4B, the selected tool 80 is aligned with the path of the head, and the head has been moved into engagement with the tool 80.

Thereafter, and as illustrated in FIG. 4C, the head 20 is retracted from the tool storage rack, carrying the tool 80 and leaving an empty cartridge 64. The head is then retracted to a lateral position aligned with the lateral point on the workpiece to be operated upon (e.g., work location). In similar fashion, the back rail table 45a indexes the workpiece 16 to the appropriate X-coordinate, and punching commences. When it is desired to select a new tool for operation, the back rail table 45a will again be indexed into the position shown in FIG. 4B to align the empty cartridge at location for tool 80 with the lateral path of the head. Thereafter, the head will be brought again into engagement with the cartridge to deposit the tool 80 back on the storage rack. The head 20 will then be retracted a sufficient distance to allow longitudinal movement of the back rail to indexably align the head with the next tool selected for operation.

It will now be appreciated that what has been provided is an inexpensive automatic tool change capability for numerically controlled punch press. The press is of the type which has a back rail which indexes the workpiece along an X axis and a work head which indexes the punch along a Y axis. A plurality of tools are fitted to the back rail along with the workpiece clamps. When it is desired to perform a tool change operation, the back rail is indexed to a tool change X-coordinate and the work head is indexed across the work and to the back rail. A tool set which is in position in the work head can be deposited in an empty tool holder, the tool head indexed slightly away from the back rail, the X position indexed to bring a selected tool into a tool change position, the work head again indexed into the back rail to engage the selected tool set, then the X and Y drives operated to position the work head at the desired coordinate of the workpiece to begin a further portion of the punching operation.

Tool changing is accomplished without overly complicating the machine, and a numerical control program controls the tool change operation in the same manner as an X, Y positioning operation for a punch operation. Since the machine is configured for X and Y indexing in a way which provides highly accurate indexing, in other words, avoiding positioning errors which result from unneeded movement of the workpiece along a second axis, tool changing is also accomplished without comprising machining accuracy. The basic premise of the machine, that is indexing on a single axis only, so that the machine does not attempt to impose torque loads on a heavy or large workpiece, is carried through in the tool change operation, in that only simply linear indexing along the X axis is ever required. To the extent an additional indexing movement is needed directed solely to the tool change operation, (i.e. that movement of the workpiece necessitated to move the tool rail from a tool holder position in which an old set of tools is deposited to a tool holder position which contains the new set of tools), the amount of movement can be minimized by intelligent positioning of the tools with respect to each other and to the location on the workpiece they are intended to work. Thus, in summary, what has been provided is a punch press capable of handling thick plate, heavy stock and large pieces, which is capable of accurately punching those pieces by virtue of its mode of handling the workpiece, and which provides an automatic tool change facility in such a machine in a way which does not comprise either the accuracy or capability of the machine.

What is claimed is:

1. A method of operating an N/C punch press to produce a programmed pattern of punched apertures in a workpiece using a plurality of tool sets selectively mountable in a work head and comprising the steps of:

gripping the workpiece in work clamps attached to a back table adapted for indexing along an X axis defined by a back rail;

providing a plurality of tool sets for selection by the work head, mounting the tool sets in tool holders along the back table for translation along the X axis only along with translation of the workpiece;

for each punched aperture positioning the workpiece along the X axis only and a work head along the Y axis only for X, Y positioning of a selected tool set With respect to the workpiece;

when it becomes necessary to select a new tool, positioning the back table along the X axis to bring a selected tool holder to a tool change position and indexing the tool head along the Y axis only to the tool change position, transferring a tool set, then withdrawing from the tool change position so that the tool set is transferred directly from the tool holder to the work head without requiring any Y direction movement of the workpiece.

2. A method of operating an N/C punch press to produce a programmed pattern Of punched apertures in a workpiece using a plurality of selectively mountable tool sets in a work head, the work head having a Y-axis servo for indexing thereof, and a back table with work clamps for the workpiece and an X-axis servo for indexing the workpiece along a back rail, the method comprising the steps of:

gripping the workpiece in the work clamps attached to the back table for indexing along the back rail;

providing a plurality of tool sets for selection by the work head, mounting the tool sets in tool holders along the back table for translation along the X axis only along with translation of the workpiece;

for each punched aperture, performing an N/C control of the X axis servo to move the workpiece and the Y axis servo to move the work head to select X, Y positions on the workpiece; and for each tool change operation, performing an N/C control of the X axis to position a tool and the Y axis to index the work head to enter and leave a tool change position at the back rail with respect to a selected tool holder for a tool exchange.

3. A numerically controlled punch press comprising in combination:

a bed adapted to support a workpiece;

a back rail along the back of the bed and having a back table carrying work clamps adapted to clamp the workpiece;

a first single axis servo drive for the back rail for translating the back table with work clamps to position the workpiece along the X axis;

a work head including a punch holder and a die holder for accepting a tool set, a second single axis servo drive for positioning the work head along a Y axis whereby the first and second servo drives combine for X, Y positioning of the tool set with respect to the workpiece;

a plurality of tool cartridges carried by the back table for translation therewith along the X axis, the tool cartridges releasably holding tool sets for transfer to the work head; and the numerical control including means for translating the back table along the back rail to index the cartridge of a selected tool set along the X axis to a tool changing position, and to index the tool head along the Y axis to the tool changing position for transferring the selected tool set between the work head and the selected tool carrier.

4. The punch press as defined in claim 3 wherein at least some of the tool cartridges carry tool sets which include a punch to be received in the punch holder and a die to be received in the die holder.

5. The punch press as defined in claim 3 wherein at least some of the tool sets include a stripper associated with the punch, the tool cartridges also including releasable supports for the strippers, and the tool head including a stripper holder associated with the punch holder.

6. The punch press has defined in claim 3 wherein the back table has a plurality of mounting positions, for receiving the workclamps and the tool cartridges, the mounting positions being be universal to allow interchange of workclamps and tool cartridges along the back table.

* * * * *